United States Patent
Moriyama et al.

(10) Patent No.: US 9,541,703 B2
(45) Date of Patent: Jan. 10, 2017

(54) LAMP

(71) Applicants: KABUSHIKI KAISHA TOYOTA JIDOSHOKKI, Kariya-shi, Aichi (JP); KOITO MANUFACTURING CO., LTD., Minato-ku, Tokyo (JP)

(72) Inventors: Akira Moriyama, Kariya (JP); Hideaki Terai, Kariya (JP); Koji Uchino, Shizuoka (JP); Mitsuhiko Nishijima, Shizuoka (JP)

(73) Assignees: KABUSHIKI KAISHA TOYOTA JIDOSHOKKI, Kariya-shi, Aichi (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/189,347

(22) Filed: Feb. 25, 2014

(65) Prior Publication Data

US 2014/0254196 A1 Sep. 11, 2014

(30) Foreign Application Priority Data

Mar. 11, 2013 (JP) .................................. 2013-047890

(51) Int. Cl.
*F21V 8/00* (2006.01)
*F21S 8/10* (2006.01)
*B60Q 1/30* (2006.01)

(52) U.S. Cl.
CPC ............ *G02B 6/0091* (2013.01); *B60Q 1/302* (2013.01); *F21S 48/215* (2013.01); *F21S 48/225* (2013.01);

(Continued)

(58) Field of Classification Search
CPC ...... B60Q 1/302; F21S 48/215; F21S 48/2225; F21S 48/2256; F21S 48/2281; G02B 6/0001; G02B 6/0091

(Continued)

(56) References Cited

U.S. PATENT DOCUMENTS 7,850,351 B2 * 12/2010 Pastrick ............... B60Q 1/2665
362/494
2006/0290647 A1 12/2006 Oron et al.
(Continued)

FOREIGN PATENT DOCUMENTS

CN 102818203 A 12/2012
DE 102006032373 A1 1/2008
(Continued)

OTHER PUBLICATIONS

Communication dated Dec. 1, 2015, issued by the State Intellectual Property Office People's Republic of China in counterpart application No. 201410085606.X.

*Primary Examiner* — Andrew Coughlin
(74) *Attorney, Agent, or Firm* — Sughrue Mion, PLLC

(57) ABSTRACT

A lamp comprises a light guide, a light source and a subject member; wherein an exit surface of the light guide is arranged at a position exposed to a front side of the subject member or located on a rear side of the subject member while being visible from the front side; wherein a surface of a light-guiding part about the exit surface located on the rear side is covered with paint or an opaque member so that the exit surface seen from the front side appears to have the same color as with surroundings thereof; wherein the subject member is molded by an opaque material or the rear side about the exit surface is covered with the paint or the opaque member; and wherein the light guide and the subject member are molded integrally with each other.

9 Claims, 6 Drawing Sheets

(52) U.S. Cl.
CPC ........ *F21S 48/2212* (2013.01); *F21S 48/2262* (2013.01); *F21S 48/2281* (2013.01); *F21S 48/25* (2013.01); *G02B 6/0001* (2013.01)

(58) Field of Classification Search
USPC ........ 362/494, 511, 576, 583, 606, 618, 619
See application file for complete search history.

(56) References Cited

U.S. PATENT DOCUMENTS

| | | | |
|---|---|---|---|
| 2010/0091508 A1* | 4/2010 | Fukasawa et al. | 362/494 |
| 2010/0182143 A1* | 7/2010 | Lynam | 340/465 |
| 2013/0051047 A1* | 2/2013 | Endoh | B60R 1/06 362/494 |

FOREIGN PATENT DOCUMENTS

| | | |
|---|---|---|
| DE | 102008017345 A1 | 11/2008 |
| DE | 102009004985 A1 | 7/2010 |
| DE | 102011106595 A1 | 12/2012 |
| JP | 07-112640 A | 5/1995 |
| JP | 2002-216510 A | 8/2002 |
| JP | 2009099454 A | 5/2009 |
| WO | 2012175369 A1 | 12/2012 |

\* cited by examiner (Section A1–A1)

(A2 View)

LAMP

BACKGROUND OF THE INVENTION

Field of the Invention

The present invention relates to a lamp having a subject member made of a resin, glass, or the like, an LED serving as a light source, and a light guide for guiding the light emitted from an entrance surface to an exit surface.

Related Background Art

Examples of recent vehicles include those equipped with lamps having a novel lighting state with a three-dimensional feel for the purpose of differentiation and the like.

For instance, the prior art described in Patent Literature 1 (Japanese Patent Application Laid-Open No. 2002-216510) discloses, as FIG. 6A illustrates, a vehicle signal lamp comprising a lens 110A arranged at the front face of a lamp 110, a body 110B constituting the bottom and side faces of the lamp 110, and an LED 111 (light-emitting diode), a light guide 114, a heat shield plate 115, and an incandescent bulb 116 which are contained in the lamp 110. In the lamp 110, light L emitted from the LED 111 is reflected circumferentially by a first primary reflection surface 112A and obliquely rearward by a second primary reflection surface 112B. The circumferentially reflected part of light L is reflected forward to the lens 110A by a first secondary reflection surface 113A, while the obliquely rearward reflected part of light L is reflected forward to the lens 110A by a second secondary reflection surface 113B. The light L thus forward reflected by the first and second secondary reflection surfaces achieves a lighting state with a three-dimensional feel.

On the other hand, for example, the prior art described in Patent Literature 2 (Japanese Patent Application Laid-Open No. H07-112640) discloses a warning lamp for a vehicle comprising, as FIG. 6B illustrates, a hologram 128 attached to the inside of a rear window 120 of the vehicle and a light guide 124 for guiding light L from a light source 121 directed from the rear side of the hologram 128 to the outside of the rear window 120. The hologram 128 is surrounded by a black ceramic mask layer 126, while the hologram 128 and its surrounding black ceramic mask layer 126 are covered with a frame 127. The frame 127 is secured to a vehicle body 123.

SUMMARY OF THE INVENTION

Among novel lamps which have been unknown in recent years, there have been demands for a previously nonexisting lamp which suddenly emits light at a position not seen as a light-emitting part by others when unlit (i.e., a position where the others have never expected light to be emitted).

However, if the lens 110A is obviously a convex or concave lens in the prior art described in Patent Literature 1, others seeing the lens 110A can easily expect light to be emitted at this position even when unlit. Even if the lens 110A is a simple flat transparent member instead of the convex or concave lens, others can see the light guide 114 and LED 111 behind the transparent lens 110A and thus can easily expect this position to emit light even when unlit.

In the prior art described in Patent Literature 2, others can see the hologram 128 arranged behind the rear window 120, while the hologram is surrounded by the black ceramic mask layer, and thus can easily expect light to be emitted from the position surrounded by the black ceramic mask layer.

In view of such points, it is an object of the present invention to provide a lamp whose light-emitting part is hard to be seen by others when unlit and which can emit light at a position where the others have never expected light to be emitted.

For achieving the above-mentioned object, the lamp in accordance with the present invention takes the following means.

A first aspect of the present invention is a lamp comprising a light guide having an entrance surface for receiving light from a light source, an exit surface for emitting the light entering from the entrance surface, and a light-guiding part for guiding the light entering from the entrance surface to the exit surface; the light source disposed at a position opposing the entrance surface; and a subject member for attaching the light guide thereto.

The exit surface of the light guide is arranged at a position exposed to a front side of the subject member or located on a rear side of the subject member while being visible from the front side of the subject member; a surface of the light-guiding part about the exit surface located on the rear side of the subject member is covered with paint or an opaque member so that the exit surface seen from the front side of the subject member appears to have the same color as with surroundings thereof; the subject member is molded by an opaque material or the rear side of the subject member about the exit surface is covered with the paint or the opaque member; and the light guide and the subject member are molded integrally with each other.

In the first aspect of the invention, the exit surface of the light guide is arranged at a position exposed to the front side of the subject member or located on the rear side of the subject member, the surface of the light-guiding part about the exit surface located on the rear side of the subject member is covered with paint or an opaque member so that the exit surface seen from the front side of the subject member appears to have the same color as with surroundings thereof, and the subject member is molded by an opaque material or the rear side of the subject member about the exit surface is covered with the paint or the opaque member. Also, the light guide and subject member molded integrally with each other yield a structure in which their boundary is hard to see.

This can achieve a lamp whose light-emitting part is hard to be seen by others when unlit and which can emit light at a position where the others have never expected light to be emitted.

A second aspect of the present invention is a lamp in accordance with the first aspect of the invention in which the light-guiding part in the light guide has a bent form from the entrance surface to the exit surface.

The second aspect of the invention can increase the degree of freedom in arranging the light source, e.g., so as to place the light source securely at a position not directly seen by others, by bending the light-guiding part.

A third aspect of the present invention is a lamp in accordance with the first or second aspect of the invention in which the exit surface of the light guide is arranged at an outermost edge part on the front side of the subject member.

In the third aspect of the present invention, the exit surface is arranged at the outermost edge part on the front side of the subject member.

This can emit light at the outermost edge part (the edge part of the body 110B in FIG. 6A) where it has been impossible for light to be emitted in a conventional lamp such as the one illustrated in FIG. 6A, for example, whereby light can be emitted at a position where others have never expected light to be emitted.

A fourth aspect of the present invention is a lamp in accordance with one of the first to third aspects of the invention in which the entrance surface of the light guide is surface-treated for the light entering the light-guiding part from the entrance surface to be refracted into a plurality of directions.

In the fourth aspect of the invention, the entrance surface of the light guide is surface-treated such as to refract light into a plurality of directions.

This allows light to diffuse into a plurality of directions at the entrance surface and the diffused light to exit from the exit surface, thereby making the exit surface as a whole to emit light uniformly.

A fifth aspect of the present invention is a lamp in accordance with one of the first to fourth aspects of the invention in which the subject member is a transparent or opaque resin or glass when the exit surface of the light guide is arranged at the position exposed to the front side of the subject member, and the subject member is a transparent resin or glass when the exit surface of the light guide is arranged at the position located on the rear side of the subject member.

In the fifth aspect of the invention, the subject member is a transparent or opaque resin or glass when the exit surface is exposed to the front side of the subject member, and the subject member is a transparent resin or glass when the exit surface of the light guide is arranged on the rear side of the subject member without being exposed to the front side.

This allows the light from the exit surface to be transmitted to the front side of the subject member even when the exit surface is not exposed to the front side of the subject member.

DESCRIPTION OF THE PREFERRED EMBODIMENTS

In the following, embodiments of the present invention will be explained with reference to the drawings. The present invention is a lamp whose light-emitting part is hard to be seen by others when unlit and which can emit light at a position where light has never been expected to be emitted.

Figure 1A:
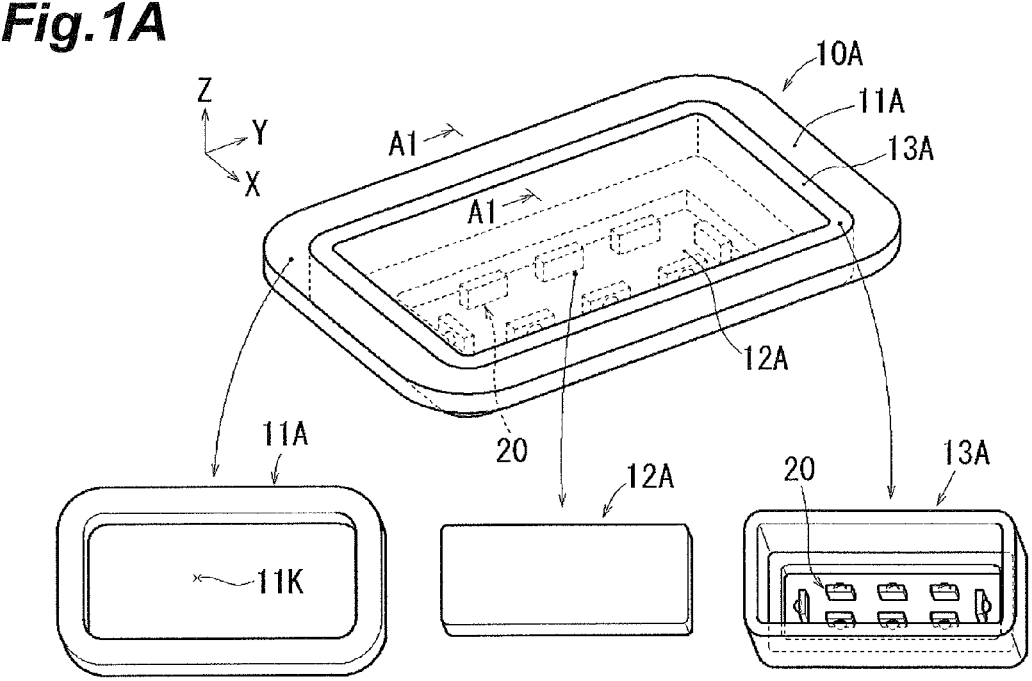
FIG. 1A is a perspective view illustrating the exterior of the lamp in accordance with a first embodiment and its constituents.
Figure 1B:
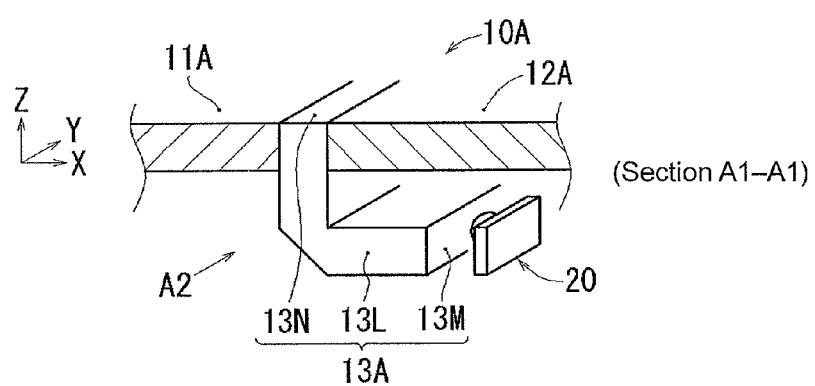
FIG. 1B is a sectional view taken along the line A1-A1 in FIG. 1A.
Figure 1C:
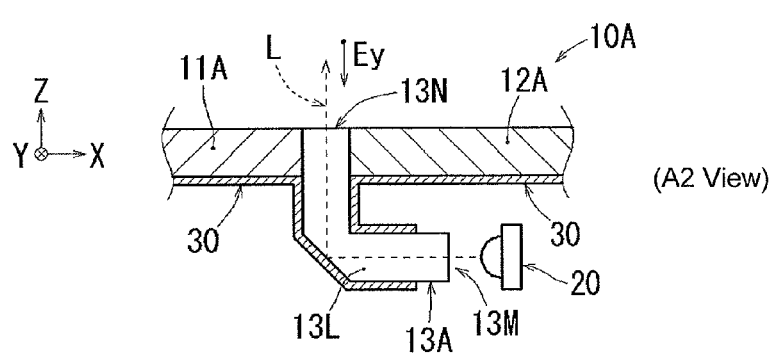
FIG. 1C is a view as seen in the direction of A2 in FIG. 1B.

Structure of Lamp 10A of First Embodiment (FIGS. 1A to 1C)

As FIGS. 1A to 1C illustrate, a lamp 10A of the first embodiment has a light guide 13A, subject members 11A, 12A (members to be provided with a light-emitting part) for attaching the light guide 13A thereto, and an LED 20 (i.e., a light-emitting diode, which corresponds to a light source).

The lamp 10A of the first embodiment represents an example in which an exit surface 13N of the light guide 13A is exposed to the front side of the subject members 11A, 12A.

In the example of this embodiment, the subject members to be provided with the light-emitting part are constituted by the planar subject member 12A and the subject member 11A having a hollow part 11K which can contain the subject member 12A.

Each of the subject members 11A, 12A is a transparent or opaque resin or glass.

As FIGS. 1B and 1C illustrate, an edge part on the exit surface 13N side of the light guide 13A is held between boundaries of the subject members 11A, 12A, and the exit surface 13N is arranged so as to be exposed to the front side of the subject members 11A, 12A.

The light guide 13A and the subject members 11A, 12A are integrally molded by two-color molding or the like. The integral molding can manufacture the lamp 10A relatively easily and make it harder to see boundaries between the light guide 13A and the subject members 11A, 12A.

The light guide 13A is a transparent resin, for example, and has an entrance surface 13M for receiving light from an LED 20 serving as a light source, the exit surface 13N for emitting the light entering from the entrance surface 13M, and a light-guiding part 13L for guiding the light entering from the entrance surface 13M to the exit surface 13N.

One or a plurality of LEDs 20, each of which is placed at a position opposing the entrance surface 13M, are arranged according to the size of the entrance surface 13M.

As FIG. 1C illustrates, when the exit surface 13N is seen in a direction from a viewpoint By on the front side of the subject members 11A, 12A, the light guide 13A is bent into such a form that the LED 20 is invisible beyond the exit surface 13N, while the entrance surface 13M and the LED 20 are arranged at positions routed to the rear side of a color part 30.

Further, as FIG. 1C illustrates, the surface of the light-guiding part 13L and the surroundings of the exit surface 13N on the rear side of the subject members 11A, 12A are covered with the color part 30 formed by paint or an opaque member (opaque resin or the like). The color part 30 is black, for example, but may have various colors without being restricted to black. Here, the color part 30 is omitted in FIGS. 1A and 1B. When the color part 30 is an opaque member, the color part 30 may be molded either integrally or not with the light guide 13A and the subject members 11A, 12A.

When the subject members 11A, 12A are made of an opaque resin or glass, the color part 30 preferably has the same color as with the subject members 11A, 12A. In this case, the color part 30 may cover the surface of the light-guiding part 13L alone.

In the foregoing, the surface of the light-guiding part 13L about the exit surface 13N located on the rear side of the subject member 11A is covered with paint or an opaque member. The subject member 11A is molded by an opaque material, or the rear side of the subject member 11A about the exit surface 13N is covered with the paint or opaque member covering the surface about the exit surface in the light-guiding part. When the subject member 11A is molded by an opaque material, the latter may be the same as or different from the opaque member used in the color part 30.

When the subject members 11A, 12A are made of a transparent resin or glass, the color part 30 may have any color but preferably is black, which makes the exit surface 13N harder to see.

As explained in the foregoing, the first embodiment molds the light guide 13A integrally with the subject members 11A, 12A, so as to make their boundaries hard to see. Since the color part 30 is provided, when viewing the exit surface 13N in the direction from the viewpoint By on the front side, the color part 30 seen behind the exit surface 13N appears to have the same color as with the surroundings of the exit surface 13N, whereby the existence of the exit surface 13N can be made less visible.

This can make the exit surface 13N (light-emitting part) hard to see from the front side of the subject member when the LED 20 is unlit, and can emit light at a position where light has never been expected to be emitted.

While FIGS. 1A to 1C illustrate an example of a structure in which the light guide 13A is held between two subject members, the light guide is not limited to annular forms; one subject member may be formed with a slit, into which the light guide may be inserted so as to expose the exit surface.

Since the light-guiding part 13L of the light guide 13A has a bent form (i.e., the form (path) from the entrance surface 13M to the exit surface 13N is bent), the LED 20, which is desired to be arranged at a position not directly seen from the viewpoint Ey, can have a degree of freedom in its arrangement.

Figure 2A:
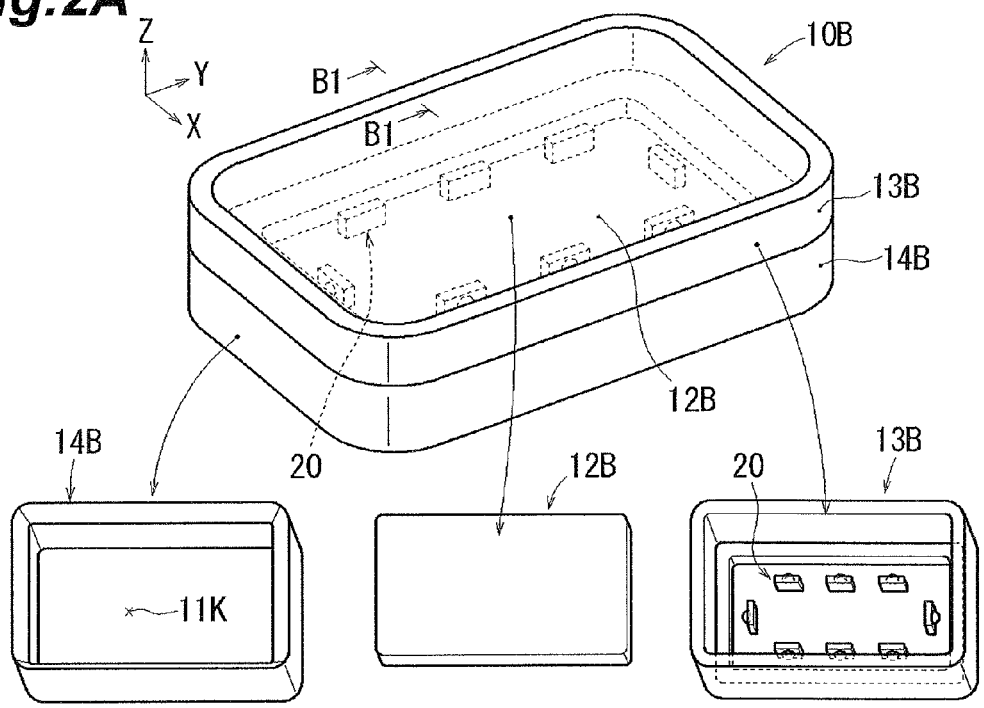
FIG. 2A is a perspective view illustrating the exterior of the lamp in accordance with a second embodiment and its constituents.
Figure 2B:
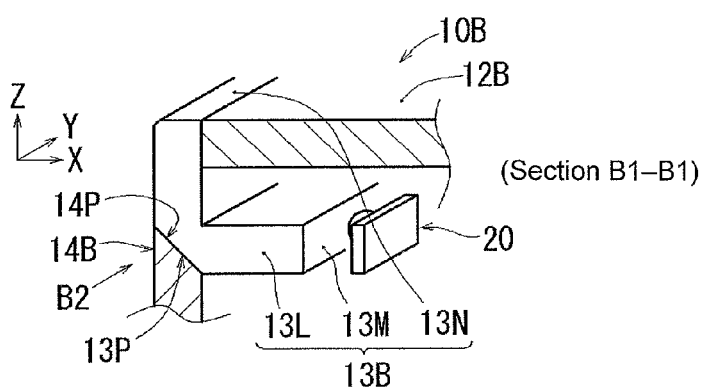
FIG. 2B is a sectional view taken along the line B1-B1 in FIG. 2A.
Figure 2C:
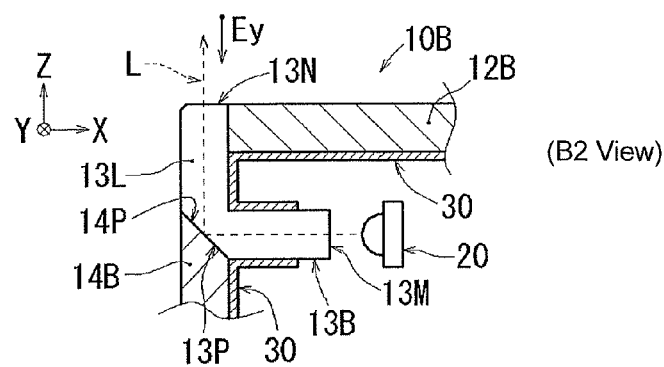
FIG. 2C is a view as seen in the direction of B2 in FIG. 2B.

Structure of Lamp 10B of Second Embodiment (FIGS. 2A to 2C)

As FIGS. 2A to 2C illustrate, a lamp 10B of the second embodiment differs from the first embodiment depicted in FIGS. 1A to 1C in that the exit surface 13N of a light guide 13B is arranged at the outermost edge part on the front side of a subject member 12B.

This difference will now mainly be explained.

The lamp 10B has the light guide 13B, subject members 12B, 14B (members to be provided with light-emitting parts) for attaching the light guide 13B thereto, and an LED 20 serving as a light source.

In the example of this embodiment, the subject members to be provided with the light-emitting part are constituted by the planar subject member 12B and the subject member 14B having the hollow part 11K.

As FIGS. 2B and 2C illustrate, the light guide 13B and the subject member 12B are integrally molded such that an end face of the subject member 12B is in contact with an inner wall part of the light guide 13B adjacent to the exit surface 13N of the light guide 13B, whereby the boundary between the light guide 13B and the subject member 12B is hard to see. The exit surface 13N is arranged so as to be exposed to the front side of the subject member 12B.

The light guide 13B and the subject member 14B are molded integrally such that a tilted surface 13P of the light guide 13B and a tilted surface 14P of an edge part of the subject member 14B are in contact with each other.

As FIG. 2C illustrates, when the exit surface 13N is seen in a direction from the viewpoint By on the front side of the subject member 12B, the light guide 13B is bent into such a form that the LED 20 is invisible beyond the exit surface 13N, while the entrance surface 13M and the LED 20 are arranged at positions routed to the rear side of the color part 30.

Further, as FIG. 2C illustrates, the surface of the light-guiding part 13L and the surroundings of the exit surface 13N on the rear side of the subject members 12B, 14B are covered with the color part 30 formed by paint or an opaque member. As in the first embodiment, the color part 30 may have various colors without being limited to black. The color part 30 is omitted in FIGS. 2A and 2B.

When the subject members 12B, 14B are made of an opaque resin or glass, the color part 30 preferably has the same color as with the subject members 12B, 14B. In this case, the color part 30 may cover the surface of the light-guiding part 13L alone.

In the foregoing, the surface of the light-guiding part 13L about the exit surface 13N located on the rear side of the subject member 12B is covered with paint or an opaque member. The subject member 12B is molded by an opaque material, or the rear side of the subject member 12B about the exit surface 13N is covered with the paint or opaque member covering the surface about the exit surface in the light-guiding part. When the subject member 12B is molded by an opaque material, the latter may be the same as or different from the opaque member used in the color part 30.

When the subject members 12B, 14B are made of a transparent resin or glass, the color part 30 may have any color but preferably is black, which makes the exit surface 13N harder to see.

As explained in the foregoing, the second embodiment makes the boundary between the light guide 13B and the subject member 12B hard to see by integral molding as with the first embodiment. Providing the color part 30 can also make the existence of the exit surface 13N harder to see as in the first embodiment.

Figure 6A:
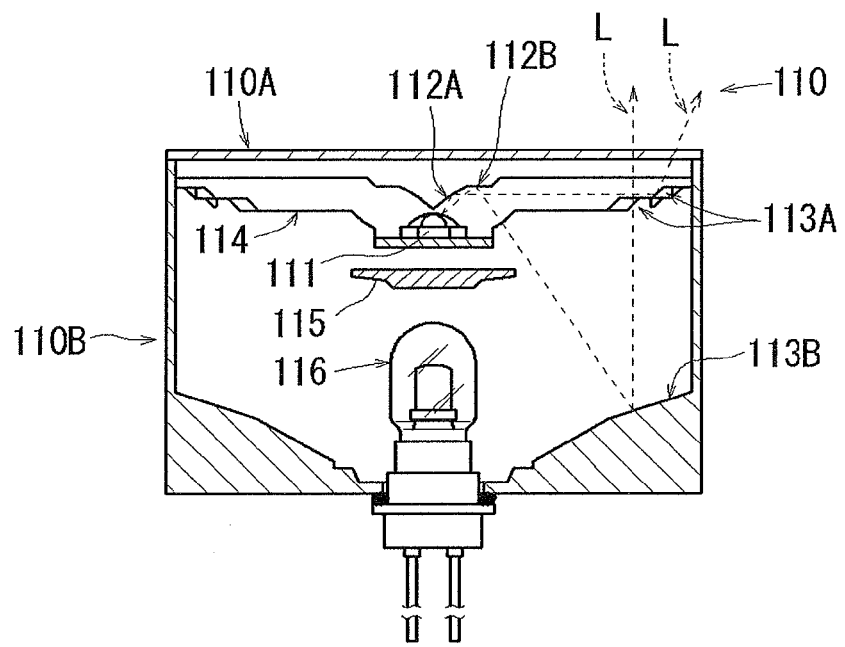
FIGS. 6A and 6B are views for explaining structures of conventional lamps.
Figure 6B:
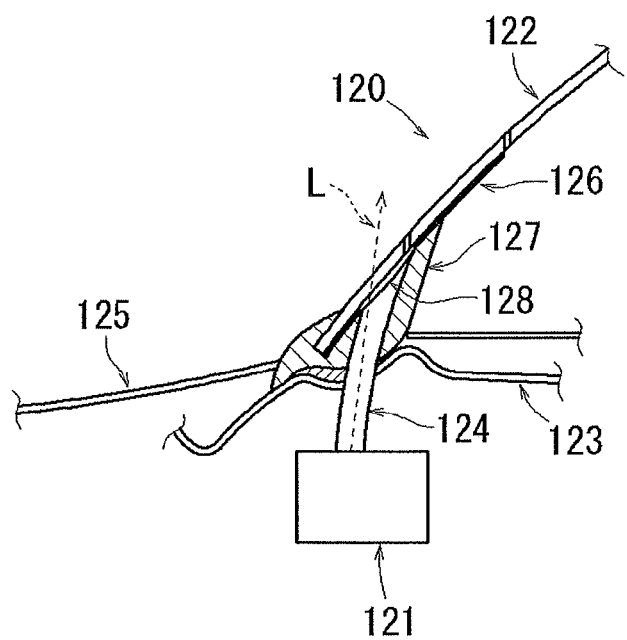

Further, by placing the exit surface 13N at the outermost edge part on the front side of the subject member 12B, the second embodiment can arrange the light-emitting part in a region which has conventionally been unable to emit light as in the lamp illustrated in FIG. 6A.

This can make the exit surface 13N (light-emitting part) hard to see from the front side of the subject member when the LED 20 is unlit, and can emit light at a position where light has never been expected to be emitted.

Figure 3A:
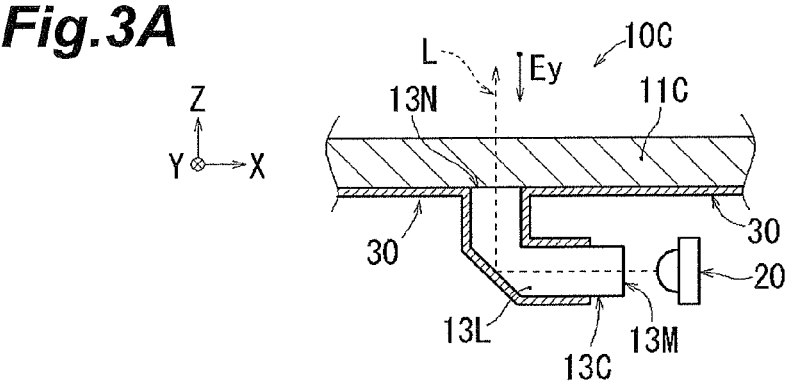
FIGS. 3A to 3D are views for explaining examples in which an exit surface of a light guide is arranged on the rear side of a subject member.
Figure 3B:
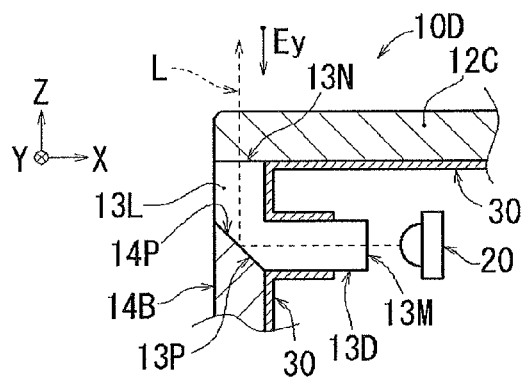
Figure 3C:
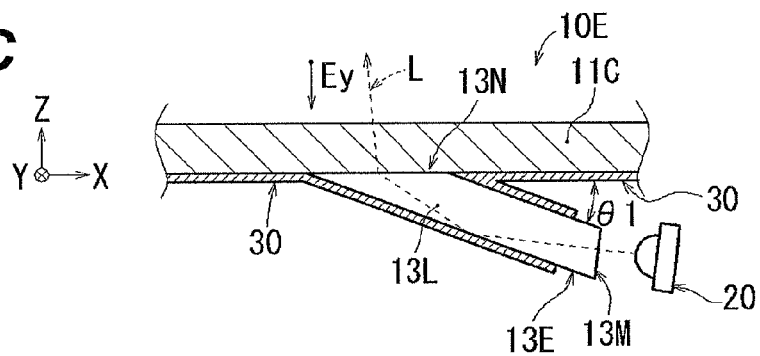

Examples of Arranging Exit Surface of Light Guide on Rear Side of Subject Member (FIGS. 3A to 3C)

The exit surface 13N, which is arranged so as to be exposed to the front side of the subject member in the first and second embodiments explained with reference to FIGS. 1A to 1C and 2A to 2C, may be arranged on the rear side of the subject member if the latter is transparent. This can make the exit surface 13N (light-emitting part) harder to see from the front side of the subject member.

Examples of the lamp in which the exit surface 13N of the light guide is arranged at a position on the rear side of the subject member made of a transparent resin or glass will now be explained.

FIG. 3A is a sectional view of a lamp 10C in which a subject member 11C and a light guide 13C are molded integrally with each other such that the exit surface 13N of the light guide 13C is in contact with the rear side of a position which is not the outermost edge part of the subject member 11C made of a transparent resin or glass. The color part 30 is the same as that in the first embodiment and thus will not be explained.

When seeing the exit surface 13N in the direction from the viewpoint By on the front side of the subject member 11C, the entrance surface 13M and the LED 20 are arranged at positions routed to the rear side of the color part 30, whereby the LED 20 is invisible. The exit surface 13N is not exposed to the front side of the subject member, so that only the color of the color part 30 is visible, which can make the existence of the exit surface 13N harder to see.

FIG. 3B is a sectional view of a lamp 10D in which a subject member 12C and a light guide 13D are molded integrally with each other such that the exit surface 13N of the light guide 13D is in contact with the rear side of the outermost edge part of the subject member 12C made of a transparent resin or glass. The light guide 13D and the subject member 14B are molded integrally with each other as in the second embodiment. The subject member 14B may be a transparent or opaque resin or glass. The color part 30 is the same as that in the second embodiment and thus will not be explained.

When seeing the exit surface 13N in the direction from the viewpoint By on the front side of the subject member 11C, the entrance surface 13M and the LED 20 are arranged at positions routed to the rear side of the color part 30, whereby the LED 20 is invisible. The exit surface 13N is not exposed to the front side of the subject member, so that only the color of the color part 30 and that of the subject member 14B are visible, which can make the existence of the exit surface 13N harder to see.

A lamp 10E illustrated in the sectional view of FIG. 3C differs from the lamp 10C depicted in the sectional view of FIG. 3A in that the subject member 11C is integrally molded with a light guide 13E having a light-guiding part 13L which is not bent but linear from the entrance surface 13M to the exit surface 13N with an inclination angle θ1.

The arrangement of the LED 20 and the angle of the entrance surface 13M are adjusted such that the light L emitted from the LED 20 aligns with the viewpoint Ey.

When seeing the exit surface 13N in the direction from the viewpoint By on the front side of the subject member 11C, the entrance surface 13M and the LED 20 are arranged at positions routed to the rear side of the color part 30, whereby the LED 20 is invisible also in this case. The exit surface 13N is not exposed to the front side of the subject member, so that only the color of the color part 30 is visible, which can make the exit surface 13N hard to see.

Figure 3D:
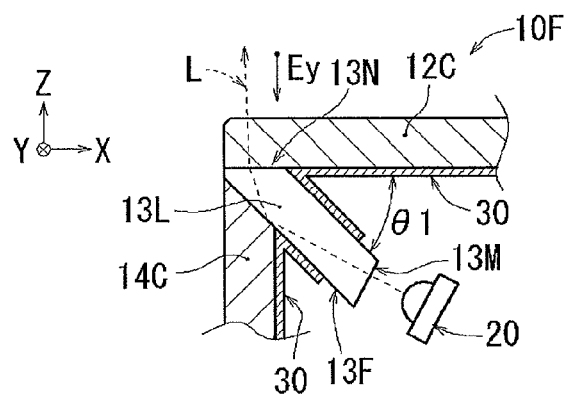

A lamp 10F illustrated in the sectional view of FIG. 3D differs from the lamp 10D depicted in the sectional view of FIG. 3B in that the subject member 12C is integrally molded with a light guide 13F having a light-guiding part 13L which is not bent but linear from the entrance surface 13M to the exit surface 13N with an inclination angle θ1.

The arrangement of the LED 20 and the angle of the entrance surface 13M are adjusted such that the light L emitted from the LED 20 aligns with the viewpoint Ey.

When seeing the exit surface 13N in the direction from the viewpoint Ey on the front side of the subject member 12C, the entrance surface 13M and the LED 20 are arranged at positions routed to the rear side of the color part 30, whereby the LED 20 is invisible also in this case. The exit surface 13N is not exposed to the front side of the subject member, so that only the color of the color part 30 and that of the subject member 14C are visible, which can make the exit surface 13N hard to see.

The exit surface 13N of the light guide 13E illustrated in the example of FIG. 3C may be constructed so as to be exposed to the front side of the subject member 11C, while the exit surface 13N of the light guide 13F illustrated in the example of FIG. 3D may be constructed so as to be exposed to the front side of the subject member 12C.

Figure 4A:
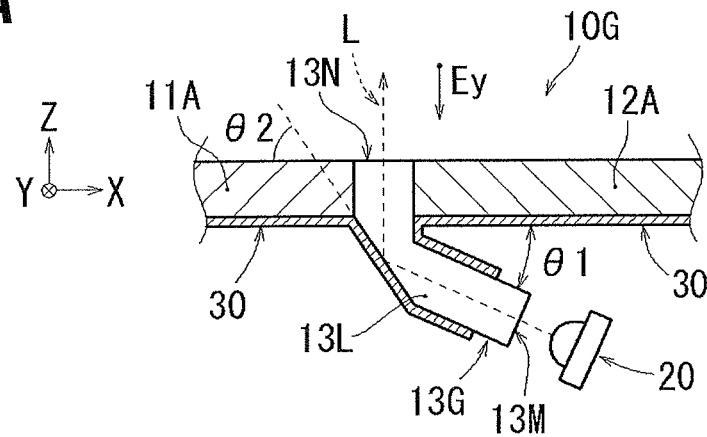
FIGS. 4A to 4C are views for explaining examples in which the bending angle of the light guide is changed.
Figure 4B:
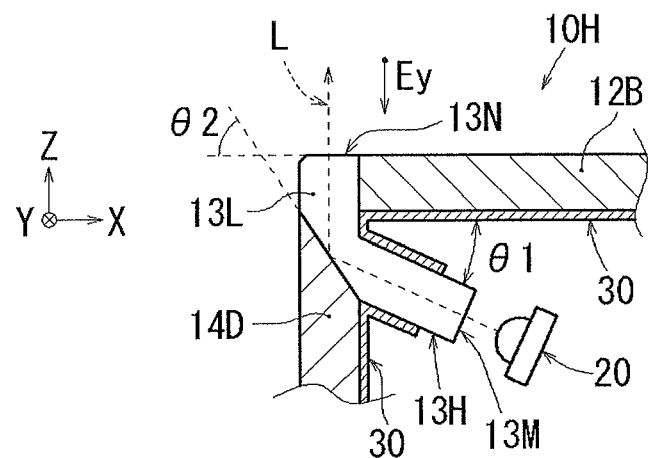
Figure 4C:
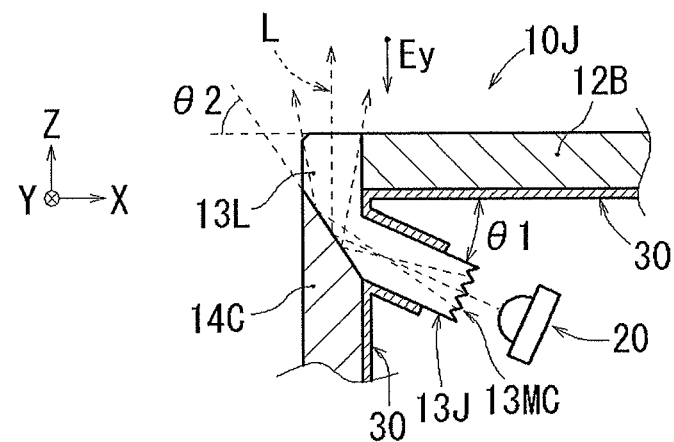

Examples of Altering Angle for Bending Light-Guiding Part (FIGS. 4A to 4C)

While the first and second embodiments explained with reference to FIGS. 1A to 1C and 2A to 2C illustrate examples in which the light-guiding part 13L from the entrance surface 13M to the exit surface 13N is bent at a right angle, the light-guiding part may also be bent at angles other than the right angle.

For example, as for the lamp 10A having the perpendicularly bent light guide 13A illustrated in the sectional view of FIG. 1C, a light guide 13G may be bent at an angle other than the right angle as in a lamp 10G illustrated in the sectional view of FIG. 4A.

As for the lamp 10B having the perpendicularly bent light guide 13B illustrated in the sectional view of FIG. 2C, a light guide 13H may be bent at an angle other than the right angle as in a lamp 10H illustrated in the sectional view of FIG. 4B.

This enhances the degree of freedom in the form of the light guide and the arrangement position of the LED.

Of course, the light-guiding part 13L in each of the light guides 13C, 13D of the lamps 10C, 10D illustrated in the sectional views of FIGS. 3A and 3B may also be bent at angles other than the right angle.

A lamp 10J illustrated in the sectional view of FIG. 4C represents an example which differs from the lamp 10H illustrated in the sectional view of FIG. 4B in that an entrance surface 13MC is surface-treated such that it has a cut lens or frosted glass form for refracting (diffusing) light incident thereon into a plurality of directions.

Since the entrance surface 13M is not surface-treated in the lamp 10H illustrated in the sectional view of FIG. 4B, the LED 20 emitting light is visible as it is when the light emitted from the exit surface 13N is seen by others in the direction from the viewpoint Ey. That is, the LED emitting light is seen through the light guide, and the exit surface does not emit light uniformly.

In the lamp 10J illustrated in the sectional view of FIG. 4C, by contrast, the entrance surface 13MC is surface-treated, so as to diffuse light, whereby the exit surface 13N as a whole appears to emit light uniformly when the light exiting from the exit surface 13N is seen by others in the direction from the viewpoint By on the front side.

The surface treatment for the entrance surface is applicable to each of the above-mentioned lamps 10A to 10H.

Figure 5A:
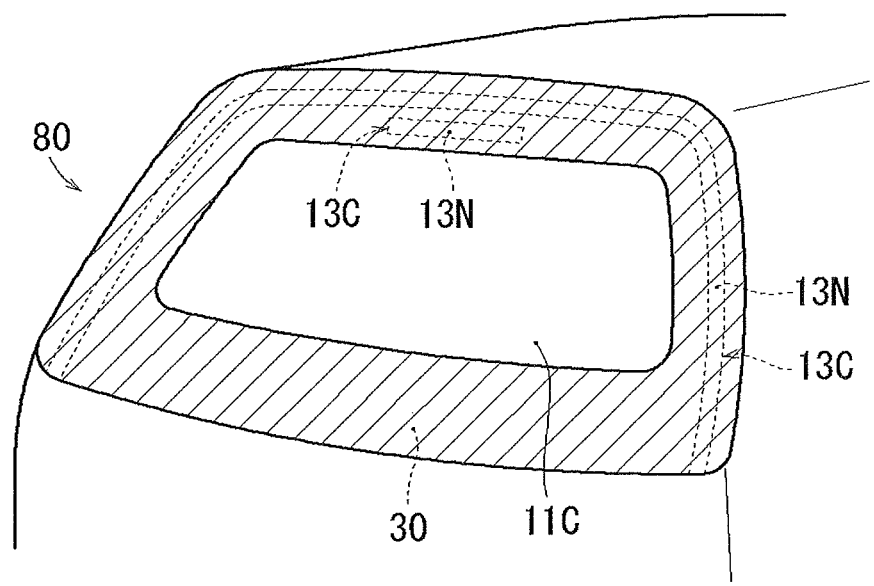
FIGS. 5A and 5B are views for explaining an example in which the lamp of the present invention is applied to a rear window of a vehicle.
Figure 5B:
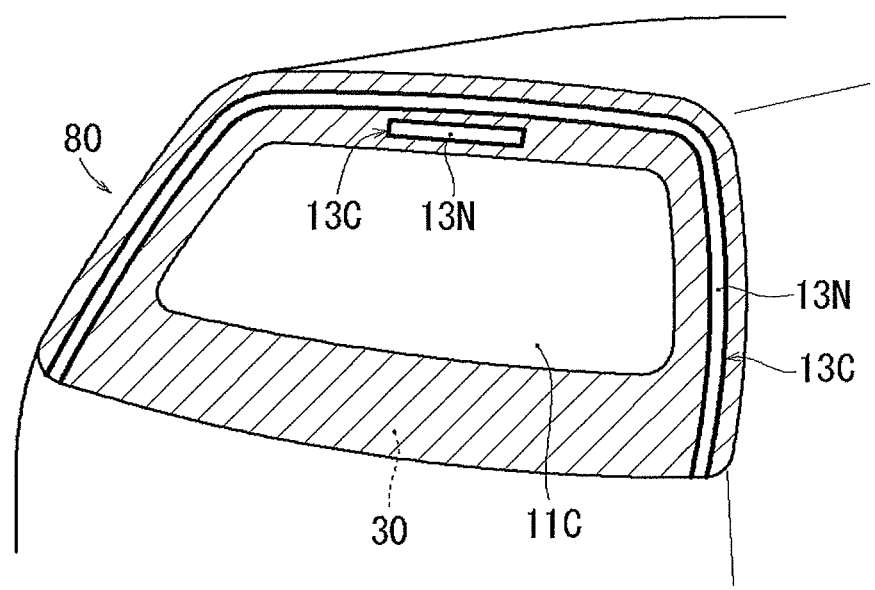

Example of Applying Lamp of Present Invention to Rear Window of Vehicle (FIGS. 5A and 5B)

A case where the lamp of the present invention is applied to a rear window of a vehicle will now be explained with reference to FIGS. 5A and 5B.

In this case, the subject member is a transparent resin or a transparent glass body, while the transparent body (subject member 11C) and the light guide 13C are integrally molded by two-color molding or the like such that the exit surface 13N of the light guide 13C is arranged on the rear side of the subject member 11C in the structure illustrated in FIG. 3A, for example. The color part 30 is provided on the surface of the light guide about the exit surface 13N and the rear side of the transparent body (subject member 11C) about the exit surface 13N. An LED, which is not depicted, is arranged at a position opposing the entrance surface of the light guide 13C.

In this example, the light guide 13C integrally molded with the transparent body (subject member 11C), the color part 30, and the LED construct a lamp 80 (rear window in this case).

An example of FIG. 5A illustrates a state of the lamp 80 (rear window) when the LED is unlit. In this case, others viewing the lamp 80 in the direction from the front side of the lamp 80 are hard to visually recognize that the exit surface 13N of the light guide 13C is arranged at the position of the color part 30 and, in particular, very hard to see the exit surface 13N when the color part 30 is black. It is therefore very difficult for others to expect a portion of the color part 30 to emit light.

An example of FIG. 5B illustrates a state of the lamp 80 (rear window) when the LED is lit. When the LED is lit, vivid light is emitted from the exit surface 13N arranged within the region of the color part 30.

When the LED is lit in response to a braking operation by a driver, it can be utilized as a braking warning to vehicles therebehind. It is more preferred for the entrance surface of the light guide to be surface-treated so as to diffuse light, since this allows the exit surface 13N as a whole to emit light uniformly.

This is very effective as a braking warning to the vehicles therebehind, since their drivers can greatly be surprised at vivid light suddenly emitted with a huge impact from a portion of the color part 30 where light has never been expected to be emitted.

Thus, the lamp of the present invention has a light-emitting part which is hard to be seen by others when unlit and can (suddenly) emit light at a position where the others have never expected light to be emitted.

Its structure is very simple and can be formed by just integrally molding a subject member and a light guide by two-color molding or the like, while various kinds of resins and glass may be used as materials for the subject member, thus yielding favorable productivity.

It also has such a high degree of freedom in the arrangement position of the exit surface as to be able to emit light at the outermost edge part in the subject member where it has conventionally been impossible for light to be emitted.

Therefore, the lamp of the present invention can be employed for various purposes without being limited to vehicles.

The lamp of the present invention can be subjected to various alterations, additions, and deletions within the scope not deviating from the gist of the present invention without being restricted to the configurations, structures, forms, and the like explained in the embodiments.

While the LED is used as the light source in the explanation of the embodiments, light sources other than the LED can also be utilized.

What is claimed is:

1. A lamp comprising:
    a transparent light guide having an entrance surface for receiving light from a light source, an exit surface for emitting the light entering from the entrance surface, and a light-guiding part for guiding the light entering from the entrance surface to the exit surface; and
    a pair of subject members for attaching the light guide thereto, the subject members having a front side and a rear side, wherein the front side of the subject members are visible from outside the lamp, wherein the rear side of the subject members are covered by an opaque color part;
    wherein the opaque color part further covers a portion of the light-guiding part of the light guide and is in contact with the portion of the light-guiding part;
    wherein the light source is positioned within an interior of the lamp at a position opposing the entrance surface of the light guide and posterior to the rear side of the subject members such that the light source is covered by the color part and thereby not visible from outside the lamp;
    wherein the light guide is arranged such that the exit surface of the light guide is adjacent to the front side of each subject member such that the exit surface is exposed relative to the front side of the subject members and thereby visible from outside the lamp, wherein the entrance surface of the light guide is arranged within the interior of the lamp posterior to the rear side of the subject members such that the entrance surface is covered by the color part and thereby not visible from outside the lamp such that the light guide is operable to guide light from a position not visible from outside the lamp to a position visible from outside the lamp; and
    wherein the subject members are transparent.

2. A lamp according to claim 1, wherein the light-guiding part of the light guide has a bent form from the entrance surface to the exit surface.

3. A lamp according to claim 1, wherein at least a portion of the light-guiding part of the light guide extends angularly between the exit surface and the entrance surface relative to an axis normal to the exit surface.

4. A lamp according to claim 1, wherein the exit surface of the light guide is flush with the front side of each subject member.

5. A lamp according to claim 1, wherein the exit surface of the light guide is arranged at an outermost edge part on the front side of the subject members.

6. A lamp according to claim 5, wherein the light guide has a tilted surface, at least one subject member of the pair of subject members has a tilted surface, and the light guide and the at least one subject member are molded integrally such that the tilted surface of the light guide and the tilted surface of the at least one subject member are in contact with each other.

7. A lamp comprising:
    a transparent light guide having an entrance surface for receiving light from a light source, an exit surface for emitting the light entering from the entrance surface, and a light-guiding part for guiding the light entering from the entrance surface to the exit surface; and
    a transparent subject member for attaching the light guide thereto, the subject member having a front side and a rear side, wherein the front side of the subject member is visible from outside the lamp, wherein the rear side of the subject member is substantially covered by an opaque color part;
    wherein the opaque color part further covers a portion of the light-guiding part of the light guide and is in contact with the portion of the light-guiding part;
    wherein the light source is positioned within an interior of the lamp at a position opposing the entrance surface of the light guide and posterior to the rear side of the subject member such that the light source is covered by the color part and thereby not visible from outside the lamp;
    wherein the exit surface of the light guide is arranged to abut the rear side of the subject member not covered by the color part such that the exit surface is not exposed relative to the subject member and such that the light guide, including the light guiding part, extends from the exit surface of the light guide within the interior of the lamp, wherein the light guiding part which extends from the exit surface of the light guide is substantially covered by the opaque color part, and wherein the entrance surface of the light guide is arranged within the interior of the lamp posterior to the rear side of the subject member such that the entrance surface is covered by the color part and thereby not visible from outside the lamp such that the light guide is operable to guide light from a position not visible from outside the lamp to a position visible from outside the lamp.

8. A lamp according to claim 7, wherein the light-guiding part of the light guide has a bent form from the entrance surface to the exit surface.

9. A lamp according to claim 7, wherein at least a portion of the light-guiding part of the light guide extends angularly between the exit surface and the entrance surface relative to an axis normal to the exit surface.

* * * * *